(12) United States Patent
Ren et al.

(10) Patent No.: US 11,891,304 B2
(45) Date of Patent: Feb. 6, 2024

(54) METHOD OF PREPARING A STABLE NANOFLUID OF AMPHIPHILIC JANUS NANOSHEETS IN SALT WATER

(71) Applicant: University of Houston System, Houston, TX (US)

(72) Inventors: Zhifeng Ren, Pearland, TX (US); Dan Luo, Houston, TX (US); Feng Wang, Houston, TX (US)

(73) Assignee: UNIVERSITY OF HOUSTON SYSTEM, Houston, TX (US)

(*) Notice: Subject to any disclaimer, the term of this patent is extended or adjusted under 35 U.S.C. 154(b) by 424 days.

(21) Appl. No.: 16/651,152

(22) PCT Filed: Sep. 27, 2018

(86) PCT No.: PCT/US2018/053148
§ 371 (c)(1),
(2) Date: Mar. 26, 2020

(87) PCT Pub. No.: WO2019/067735
PCT Pub. Date: Apr. 4, 2019

(65) Prior Publication Data
US 2020/0231445 A1    Jul. 23, 2020

Related U.S. Application Data

(60) Provisional application No. 62/564,700, filed on Sep. 28, 2017.

(51) Int. Cl.
*C01B 32/198* (2017.01)
*B82Y 30/00* (2011.01)
*B82Y 40/00* (2011.01)

(52) U.S. Cl.
CPC ............ *C01B 32/198* (2017.08); *B82Y 30/00* (2013.01); *B82Y 40/00* (2013.01)

(58) Field of Classification Search
None
See application file for complete search history.

(56) References Cited

U.S. PATENT DOCUMENTS

| | | | | |
|---|---|---|---|---|
| 2011/0059871 | A1* | 3/2011 | Tour | C09K 8/035 507/140 |
| 2011/0079748 | A1* | 4/2011 | Ruoff | H01G 11/36 252/62.2 |
| 2015/0114646 | A1* | 4/2015 | Price Hoelscher | C09K 8/032 166/302 |

(Continued)

FOREIGN PATENT DOCUMENTS

WO    2017/015120 A1    1/2017

OTHER PUBLICATIONS

International Patent Application No. PCT/US2018/053148 International Search Report and Written Opinion dated Nov. 20, 2018 (13 pages).

(Continued)

*Primary Examiner* — Charles R Nold
(74) *Attorney, Agent, or Firm* — CONLEY ROSE, P.C.

(57) ABSTRACT

A stable water based nanofluid of graphene-based amphiphilic Janus nanosheets, where the nanofluid has a high salt-content while retaining the interfacial activities of the nanosheets. Such a nanofluid of amphiphilic Janus nanosheets may be used for enhanced oil recovery.

14 Claims, 11 Drawing Sheets

(56) References Cited

U.S. PATENT DOCUMENTS

2016/0348498 A1* 12/2016 Zuniga .................. C01B 32/05

OTHER PUBLICATIONS

Luo, Dan et al., "Nanofluid of graphene-based amphiphilic Janus nanosheets for tertiary or enhanced oil recovery: High performance at low concentration," PNAS, Jul. 12, 2016, vol. 113, No. 28, pp. 7711-7716.
Stankovich, Sasha et al., "Stable aqueous dispersions of graphitic nanoplatelets via the reduction of exfoliated graphite oxide in the presence of poly(sodium 4-styrenesulfonate)," Journal of Materials Chemistry, 2006, vol. 16, No. 2, pp. 155-158.
Eswaraiah, Varrla et al., "Graphene-Based Engine Oil Nanofluids for Tribological Applications," Applied Materials & Interfaces, Oct. 2011, vol. 3, No. 11, pp. 4221-4227.
Luo, Dan et al., "Colloidal Stability of Graphene-Based Amphiphilic Janus Nanosheet Fluid," Chemistry of Materials, Apr. 2017, vol. 29, No. 8, pp. 3454-3460.
Zuniga, Carlos et al., "Lont-Term High-Temperature Stability of Functionalized Graphene Oxide Nanoplatelets in Arab-D and API Brine," ACS Applied Materials & Interfaces, Jan. 2016, vol. 8, No. 3, 22 pages.

* cited by examiner

METHOD OF PREPARING A STABLE NANOFLUID OF AMPHIPHILIC JANUS NANOSHEETS IN SALT WATER

CROSS-REFERENCE TO RELATED APPLICATIONS

The present application is a National Phase Entry of, and claims priority to PCT Application No. PCT/US2018/053148, filed Sep. 27, 2018, which claims priority to U.S. Provisional Patent Application No. 62/564,700, filed Sep. 28, 2017, entitled "A Method Of Preparing A Stable Nanofluid Of Amphiphilic Janus Nanosheets In Salt Water," the entire contents of each being hereby incorporated herein by reference in their entirety for all purposes.

STATEMENT REGARDING SPONSORED RESEARCH

This work was funded in part by the US Department of Energy under grant DOE DE-SC0010831.The Government may be entitled to rights in this matter.

TECHNICAL FIELD

This disclosure relates to a method of preparing a stable nanofluid of amphiphilic Janus nanosheets in salt water.

BACKGROUND

Amphiphilic Janus particles can act as solid surfactants due to their asymmetric surface wettability, which allow them to be positioned at the immiscible liquid interfaces for relatively longer periods of time than that of homogeneous particles (Binks, B. P. Curr. Opin, Colloid Interface Sci., 2002, 7, 21; and Kumar, A.; Park, B. J.; Tu, F.; Lee, D. Soft Matter, 2013, 9, 6604). These stimuli-responsive molecular amphiphiles are able to assemble into different structures, generate emulsions with different morphologies, and also induce phase inversion emulsification (Tu, F.; Lee, D. J. Am. Chem. Soc., 2014, 136, 9999; and Tu, F.; Lee, D. Chem. Commun., 2014, 50, 15549).

With appropriately decorated catalysts, amphiphilic Janus particles can therefore increase the yield and selectivity of reactions between two immiscible phases by performing interfacial catalysis (Huang, X.; Wang, Y.; Liao, X.; Shi, B. Chem. Commun., 2009, 4687; Crossley, S.; Faria, J.; Shen, M.; Resasco, D. E. Science, 2010, 327, 68; and Pera-Titus, M.; Leclercq, L.; Clacens, J. M.; Campo, F. D.; Nardello-Ratay, V. Angew. Chem. Int. Ed., 2015, 54, 2006). Moreover, when dispersed in single phase, the interactive forces generated between amphiphilic Janus particles triggers self-assembling to build controllable architectures (Chen, Q.; Whitmer, J. K.; Jiang, S.; Bae, S. C.; Luijten, E.; Granick, S. Science, 2011, 331, 199; and Chen, Q.; Bae, S. C.; Granick, S. Nature, 2011, 469, 381). In addition, simple nanofluids of amphiphilic Janus nanosheets with low concentrations were also found to effectively enhance underground oil recovery.

However, maintaining colloidal stability in environments such as high salt content or high temperature, while retaining the required surface chemical properties of such surfactants, is highly challenging, and this is also true for the use of amphiphilic Janus nanosheets.

As such, there is an unmet need in the art for a method of stabilizing a nanofluid of graphene-based amphiphilic Janus nanosheets under high salt conditions wherein the solution has a higher ionic strength than seawater (which on average, comprises about 3.5 wt. % NaCl). A stable nanofluid (surfactant) is the sort that may be used in brine, and maintain the same interface behavior of nanosheets in fresh water/oil dispersion systems.

A salt water dispersed nanofluid may further be beneficial because the methods described herein may reuse the produced formation water, and thereby reduce the cost of waste water treatment. Moreover, a fluid system that may be injected directly into oil reservoirs where there is a lack of available fresh water. In order to address such issues, disclosed herein are nanofluids comprising amphiphilic Janus nanosheets stabilized in salt water with high salt concentrations, and methods of making the same.

BRIEF DESCRIPTION OF THE DRAWINGS

For a more complete understanding of the present disclosure, reference will now be made to the accompanying drawings/figures in which.

Figure 10:
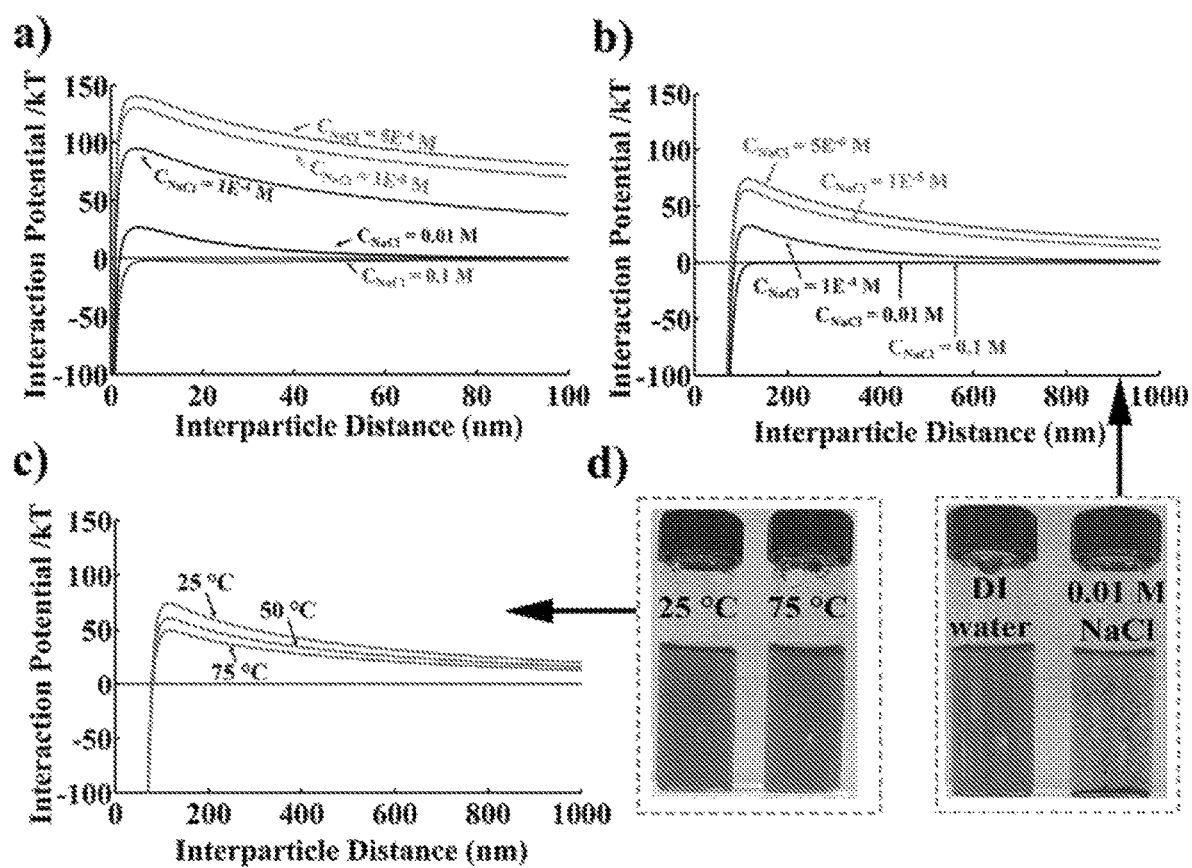
Figure 11:
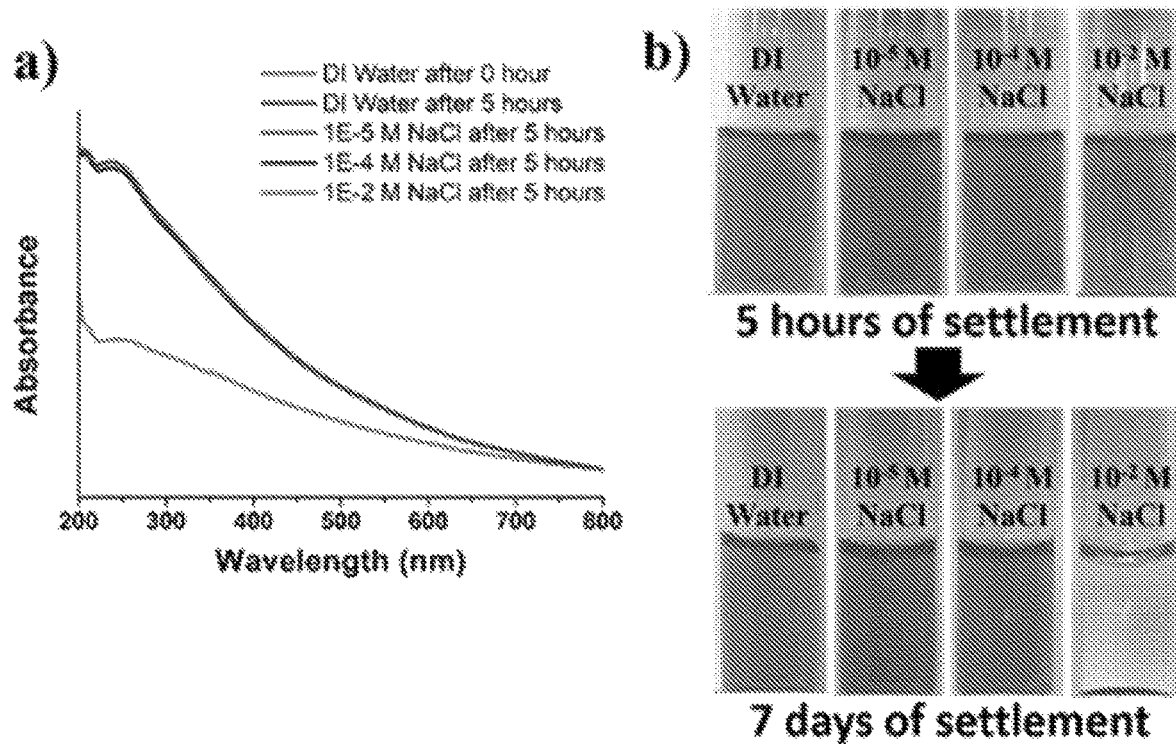

Shortest interparticle distances of every reference nanosheet in five areas. (c) Minimal interparticle distances in five areas (1 pixel≈160 nm);

FIG. 10 depicts stability evaluation. (a) Interaction potential at varying interparticle distances for different salt concentrations without accounting for hydrophobic force. (b) Interaction potential at varying interparticle distances for different salt concentrations when accounting for hydrophobic force. (c) Interaction potential at varying interparticle distances for different temperatures. (d) Stability testing of the nanofluid at different temperatures (left dashed box) and salt concentrations (right dashed box) for several hours; and FIG. 11 depicts: (a) UV-vis spectra of graphene-based amphiphilic Janus nanosheets in different solutions after a certain period of settling, wherein the lowest curve on the X axis depicts NaCl concentration of $1 \times 10^{-2}$M. (b) Visual stability evaluation after nanosheets had settled for 5 h and 7 days.

SUMMARY OF THE DISCLOSURE

Disclosed herein in some embodiments a stable salt water dispersed nanofluid is described, wherein the nanofluid comprises a polyelectrolyte; an amphiphilic Janus nanomaterial; NaCl; and $CaCl_2$. In some embodiments, the nanofluid, the polyelectrolyte is a hydrophobic polymer, or an anionic polymer, in another embodiment the polyelectrolyte is poly sodium 4-styrenesulfonate (PSS). In some embodiments of the nanofluid, the NaCl comprises least 3 wt. %, and in some embodiments of the nanofluid the $CaCl_2$ comprises about 0.5 wt. %. In other embodiments, the nanofluid is heated to at least 70° C.

In some embodiments, a stable salt water dispersed nanofluid is described wherein the amphiphilic Janus nanomaterial is a nanosheet, in some embodiments the nanosheet comprises graphene oxide, and in some further embodiments the graphene oxide is derivitized with hydrophobic or hydrophilic groups. In some embodiments the graphene oxide is derivitized with at least one alkylamine group, and in another embodiment the nanosheets are stable in a single phase. In some embodiments the nanofluid comprises an elastic film at an oil/brine interface, and in another embodiment the elastic film is formed at a temperature of at least 70° C.

In some embodiments, a stable salt water dispersed nanofluid is described wherein the nanosheets comprise a lateral dimension of about 50 to about 350 nm, in another embodiment the nanosheet thickness is about 3.7 nm, in a further embodiment the nanosheet aspect is less than 100, and in a still further embodiment the nanosheets comprise a surface conjugation ratio of about 0.48. In another embodiment of the nanofluid, poly sodium 4-styrenesulfonate (PSS) is detachable and the nanosheet remains at the oil/brine interface.

In some embodiments, a surfactant, comprising a nanofluid, comprising a polyelectrolyte; an amphiphilic Janus nanomaterial; NaCl; and $CaCl_2$ is described wherein the surfactant further comprises an elastic film at an oil/water interface. In some embodiments of the surfactant, the oil/water mixture is a hydrocarbon/brine solution, in other embodiments the surfactant forms an elastic interfacial film at a hydrophobic/hydrophilic interface, and in some embodiments the elastic interfacial film is formed in a geologic formation comprising a hydrocarbon. In a further embodiment of the surfactant, the elastic interfacial film at the hydrophobic/hydrophilic interface releases the hydrocarbon from a geological formation for enhanced oil recovery.

As described above, maintaining colloidal stability in environments such as high salt content or high temperature, while retaining surface chemical properties is challenging for fundamental science and many applications. It is known in the prior art that graphene-based amphiphilic Janus nanosheets aggregate and precipitate in salt water (such as where the salt water comprises about 0.058 wt. % NaCl). Disclosed herein, however, is a method of producing a stable water based solution of graphene-based amphiphilic Janus nanosheets, wherein the solution has a high salt-content while retaining the interfacial activities of the nanosheets. Such a nanofluid of amphiphilic Janus nanosheets may therefore be used for enhanced oil recovery. Further, such a salt water dispersed nanofluid of amphiphilic Janus nanosheets may be environmentally beneficial as large quantities of fresh water may be saved as the produced formation water may be reused, and thereby also reducing the cost of waste water treatment. Moreover, the salt water dispersed nanofluid of amphiphilic Janus nanosheets described herein may be injected directly into the geological formation for oil recovery. In addition, the method may also be applicable to other formulations of amphiphilic Janus nanomaterials. Disclosed herein, in one embodiment is a stable salt water dispersed nanofluid comprising amphiphilic Janus nanosheets; and a method of making thereof. In one embodiment, a stabilized nanofluid of graphene-based amphiphilic Janus nanosheets under salt condition (which has higher ionic strength than seawater is disclosed. In another embodiment a stabilized nanofluid of graphene-based amphiphilic Janus nanosheets is produced by mixing polyelectrolytes, and amphiphilic Janus nanosheets in brine to form the stable nanofluid while maintaining the interfacial behavior of the nanosheets (as we observed in a fresh water/oil phase dispersion.

The foregoing has outlined rather broadly certain of the features of the exemplary embodiments of the present invention in order that the detailed description that follows may be better understood. It should be appreciated by those skilled in the art that the conception and the specific embodiments disclosed may be readily utilized as a basis for modifying or designing other methods and structures for carrying out the same purposes of the invention that is claimed below.

DETAILED DESCRIPTION OF DISCLOSED EXEMPLARY EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

The following discussion is directed to various exemplary embodiments of the disclosure. One skilled in the art will understand that the following description has broad application, and the discussion of any embodiment is meant only to be exemplary of that embodiment, and that the scope of this disclosure, including the claims set out below, is not limited to that embodiment.

The drawing figures are not necessarily to scale. Certain features and components herein may be shown exaggerated in scale or in somewhat schematic form and some details of conventional elements may be omitted in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first component or device couples to a second, that connection may be through a direct engagement between the two components or devices, or through an indirect connection that is made via other intermediate devices and connections. As used herein, the term "about," when used in conjunction with a percentage or other numerical amount, means plus or minus 10% of that percentage or other numerical amount. For example, the term "about 80%," would encompass 80% plus or minus 8%. As used herein the terminology instrument, apparatus, and device may be used interchangeably. All papers, publications and other references cited herein are hereby incorporated by reference in their entirety:

Overview

Disclosed herein are embodiments of salt water dispersed nanofluids which comprise Amphiphilic Janus nanomaterials, such nanofluids may be considered in some embodiments as colloidal systems, and a stable dispersion is a prerequisite for many applications. (Stewart, M. H.; Susumu, K.; Mei, B. C.; Medintz, I. L.; Delehanty, J. B.; Blanco-Canosa, J. B.; Dawson, P. E.; Mattoussi, H. J. Am. Chem. Soc. 2010, 132, 9804; Bumb, A.; Sarkar, S. K.; Billington, N.; Brechbiel, M. W.; Neu-man, K. C. J. Am. Chem. Soc. 2013, 135, 7815.Yun, G.; Hassan, Z.; Lee, J.; Kim, J.; Lee, N.; Kim, N. H.; Baek, K.; Hwang, I.; Park, C. G. Angew. Chem. Int. Ed. 2014, 53, 6414). Stabilization of surface homogeneous nanomaterials (including nanoparticles) in various environments, e.g., biological media, salt water, and at high temperatures (Zhang, X.; Servos, M. R.; Liu, J. J. Am. Chem. Soc. 2012, 134, 9910; Mei, B. C.; Susumu, K.; Medintz, I. L.; Mattoussi, H. Nat. Protoc. 2009, 4, 412; Keller, A. A.; Wang, H.; Zhou, D.; Lenihan, H. S.; Cherr, G.; Car-dinale, B. J.; Miller, R.; Ji, Z. Environ. Sci. Technol. 2010, 44, 1962; and Zyuzin, M. V.; Honold, T.; Carregal-Romero) has been achieved through methods such as by increasing electrostatic repulsive interactions, providing steric stabilization (Mudunkotuwa, I. A.; Grassian, V. H. J. Am. Chem. Soc. 2010, 132, 14986; Shah, P.S.; Holmes, J. D.; Doty, R. C.; Johnston, K. P.; Korgel, B. A. J. Am. Chem. Soc. 2000, 122, 4245; Belfield, K. D.; Zhang L. Chem. Mater. 2006, 18, 5929; Kim, S.; Hyun, K.; Moon, J. Y.; Clasen, C.; Ahn, K. H. Langmuir 2015, 31, 1892) and generating depletion stabilization (Mao, Y.; Cates, M. E.; Lekkerkerker, H. N. W. Phys. Rev. Lett. 1995, 75, 4548).

Amphiphilic Janus nanoparticles possess asymmetric surface wettability, i.e., one side of the surface is hydrophobic while the other side is hydrophilic. Upon dispersion in either polar or non-polar solvents, self-assembly via hydrophobic or hydrophilic interactions may be triggered (Bradley, L. C.; Stebe, K. J.; Lee, D. J. Am. Chem. Soc. 2016, 138, 11437; Walther, A.; Willer, A. H. E. Chem. Rev. 2013, 113, 5194; Cheng, L.; Zhang, G.; Zhu, L.; Chen, D.; Jiang, M. Angew. Chem. Int. Ed. 2008, 47, 10171), and thereby destabilizing the system and reducing the likelihood that the amphiphilic Janus nanoparticles can remain stable in a single phase. Moreover, when large amounts of salt ions are present, the electric double layer produced by the charged, hydrophilic surface is suppressed, reducing repulsive interactions (Ojea-Jimenez, I.; Puntes, V. J. Am. Chem. Soc. 2009, 131, 13320), Thus, maintaining of colloidal stability of amphiphilic Janus nanomaterials, without impacting the surface chemistry, is both challenging and desirable.

Prior art stabilization of amphiphilic nanomaterials in brine has been limited (Kadhum, M. J.; Swatske, D. P.; Harwell, J. H.; Shiau, B.; Re-sasco, D. E. Energy Fuels 2013, 27, 6518), and previous investigation of the colloidal behavior of graphene-based amphiphilic Janus nanosheet (AJN) fluid shows that a level of 0.01 M or 0.058 wt. % of NaCl could induce unwanted aggregation and precipitation of the nanosheets within a few hours (Luo, D.; Wang, F.; Alam, M. K.; Yu, F.; Mishra, I. K.; Bao, J.; Willson, R. C.; Ren, Z. F. Chem. Mater. 2017, 29, 3454, which is herein incorporated in it's entirety). Meanwhile, the interfacial behavior of fresh water-dispersed AJNs in oil/brine, facilitated high-performance application of these nanosheets for oil recovery (Luo, D.; Wang, F.; Zhu, J.; Cao, F.; Liu, Y.; Li, X.; Willson, R. C.; Yang, Z. Z.; Chu, C. W.; Ren, Z. F. Proc. Natl. Acad. Sci. 2016, 113, 7711;Yu, D.; Wang, Y.; Zhang, J.; Tian, M.; Han, Y.; Wang, Y. J. Colloid Interface Sci. 2012, 381, 83; WO2017015120 A1, and Luo, et al., Jul. 12, 2016, vol. 113, no. 28, 7711-7716.

Therefore, a method to stabilize such AJNs would be valuable in applications such as oil recovery where fresh water is unavailable, in fresh water-scarce regions or fresh water-sensitive reservoirs, or in formations comprising a high residual ionic content. In addition, retaining the interfacial behavior of the AJNs in salt water with an ionic strength higher than seawater (on average, 0.6 M or 3.5 wt. % NaCl) is desirable.

Herein it is therefore disclosed in some embodiments that using certain concentrations of poly(sodium 4-styrenesulfonate) (PSS), graphene-based amphiphilic Janus nanosheets (AJNs) may be stabilized in relative high-salt brine (such as at 3 wt. % NaCl and 0.5 wt. % (or 0.65 M) $CaCl_2$), while the interfacial behavior of the nanosheets is maintained (the nanosheets stabilized by PSS may have the ability to self-assemble to form an elastic film at the oil/brine interface, even at temperatures, such as but not limited to about 70-100° C.

The adsorption of PSS on the hydrophilic and hydrophobic surfaces of AJN in brine is disclosed herein both experimentally and by molecular dynamics (MD) simulations. Simulations further revealed that the configuration of absorbed PSS molecules favors the generation of electrosteric repulsive interactions that stabilize the AJN in brine. The methodology is applicable to stabilizing further embodiments of amphiphilic Janus nanomaterials in high concentration brine solutions, utilizing hydrophilic or anionic polymers or electrolytes, while keeping its surface chemistry accessible.

Simulations were also used in some embodiments to examine the interfacial behavior of AJN in biphasic systems. AJN, which exhibit asymmetry in surface wettability, remained at the oil/brine interface due to PSS detachment from the hydrophobic surface. The simulation results were again experimentally confirmed. In some embodiments, an elastic interfacial film was generated when the system at 70° C., consistent with the interfacial behavior for AJN nanofluid prepared in fresh water.

EXAMPLES

Example 1

Synthesis of Graphene-Based Amphiphilic Janus Nanosheets (AJNs)

In one embodiment described herein, the amphiphilic Janus nanosheets were synthesized using the wax-masking method (Hong, L.; Jiang, S.; Granick, S. Langmuir 2006, 22, 9495; Wu, H.; Yi, W. Y.; Chen, Z.; Wang, H. T.; Du, Q. G. Carbon 2015, 93, 473). Graphene oxide (GO) was first fabricated by A chemical oxidation method (Marcano, D. C.; Kosynkin, D. V.; Berlin, J. M.; Sinitskii, A.; Sun, Z. Z.; Slesarev, A.; Alemany, L. B.; Lu, W.; Tour, J. M. ACS Nano 2010). Paraffin wax (80 g) was melted at a temperature of 75° C. and then mixed with GO (200 mg) and water (300 g) and NaCl (8 g).

The mixture was vigorously stirred at 75° C. with a speed of 1800 rpm for 1 hour and then cooled down to room temperature. After extensive wash with NaOH (pH~9), DI water and ethanol, the GO covered wax particles were dispersed in absolute alcohol solution of octadecylamine and stirred overnight. After several washes with ethanol, wax was dissolved with toluene and removed. AJNs were dried at 60° C. and the nanofluid of AJNs stabilized in DI water was made.

AJNs, as described herein were synthesized by single-side surface functionalization of graphene oxide (GO) with alkylamine. PSS (average MW 70,000 g/mol) may be used as a stabilizer because the sulfonate functional groups have relatively weak binding to multivalent cationic metal ions, including $Ca^{2+}$ and $Mg^{2+}$, and because the polymer is temperature tolerant (Yu, D.; Wang, Y.; Zhang, J.; Tian, M.; Han, Y.; Wang, Y. J. Colloid Interface Sci. 2012, 381, 83; Zuniga, C. A.; Goods, J. B.; Cox, J. R.; Swager, T. M. ACS Appl. Mater. Interfaces. 2016, 8, 1780).

Stabilization of AJN in Brine

Poly(sodium 4-styrenesulfonate) (PSS, Mw-70000 g/mol) from Sigma-Aldrich was dissolved in DI water to make solutions of different concentrations, e.g., 0.01 wt %, 0.1 wt %, 0.25 wt %, 0.5 wt %, 0.75 wt % and 0.1 wt %. Concentrated AJNs were diluted with PSS solutions to make AJN concentrations of 0.005 wt % and 0.01 wt %. The dispersions of AJN/PSS were sonicated for 30 mins before NaCl (3 wt. %) and CaCl2 (0.5 wt. %) were dissolved. Detailed composition of samples may be found below in Table 1. The AJN/PSS brine dispersions were settled for further observation and evaluation.

TABLE 1

Composition of samples tested for stability.

| Sample # | AJN (wt. %) | PSS (wt. %) | NaCl wt. % | CaCl2 (wt. %) |
|---|---|---|---|---|
| 1 | 0.005 | 0 | 0 | 0 |
| 2 | 0.005 | 0.01 | 3 | 0.5 |
| 3 | 0.005 | 0.1 | 3 | 0.5 |
| 4 | 0.005 | 0.25 | 3 | 0.5 |
| 5 | 0.005 | 0.5 | 3 | 0.5 |
| 6 | 0.005 | 0.75 | 3 | 0.5 |
| 7 | 0.005 | 1 | 3 | 0.5 |
| 8 | 0.01 | 0 | 0 | 0 |
| 9 | 0.01 | 0.01 | 3 | 0.5 |
| 10 | 0.01 | 0.1 | 3 | 0.5 |
| 11 | 0.01 | 0.25 | 3 | 0.5 |
| 12 | 0.01 | 0.5 | 3 | 0.5 |
| 13 | 0.01 | 0.75 | 3 | 0.5 |
| 14 | 0.01 | 1 | 3 | 0.5 |

Figure 5:
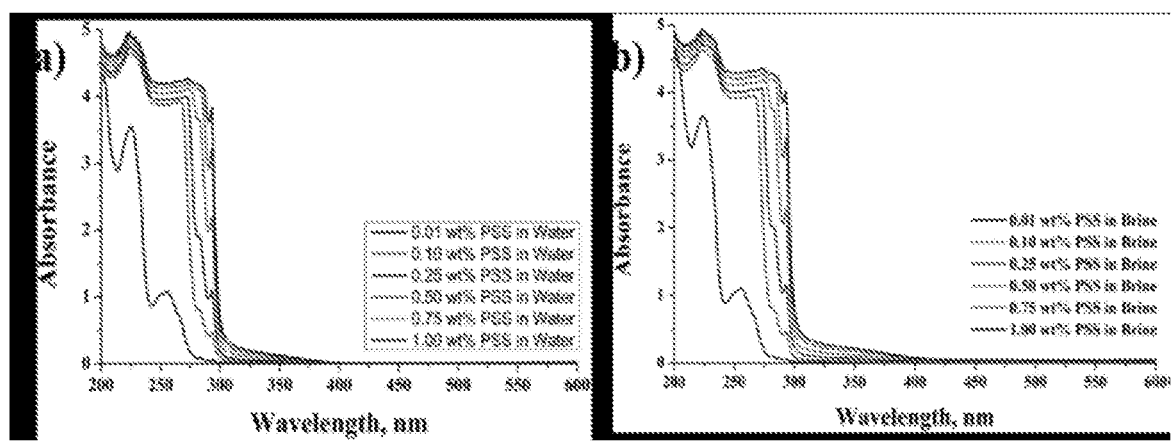
FIG. 5: depicts UV-Vis measurements of different concentrations of poly(sodium 4-styrenesulfonate) (PSS) dispersion a) in fresh water and b) in brine (containing 3 wt. % NaCl and 0.5 wt. % CaCl$_2$) wherein the lowest curve on the X axis corresponds to 0.01 wt. % PSS in brine in both plot a, and b.

The stability of the different concentrations of PSS alone in brine was demonstrated by UV-Vis measurements (FIG. 5).

Characterization

UV-Vis spectra of PSS solutions alone in brine (containing 3 wt. % NaCl and 0.5 wt. % $CaCl_2$) were measured on a Cary 5000 UV-Vis-NIR spectrophotometer. Hydrodynamic particle sizes were measured on a Malvern NanoSight NS300 and Zeta potentials were obtained from a Malvern Zetasizer Nano ZS. At selected time points, samples were taken from bottles containing different concentrations of AJN and PSS and diluted with DI water by five times for particle size measurement. The AJN/PSS samples were collected by centrifuge eliminate free PSS and re-dispersed in DI water to measure the Zeta potential. Morphology and composition of AJN and AJN/PSS samples were examined using a transmission electron microscope (TEM, JEOL 2010F) coupled with energy dispersive X-ray spectroscopy (EDS).

Figure 1:
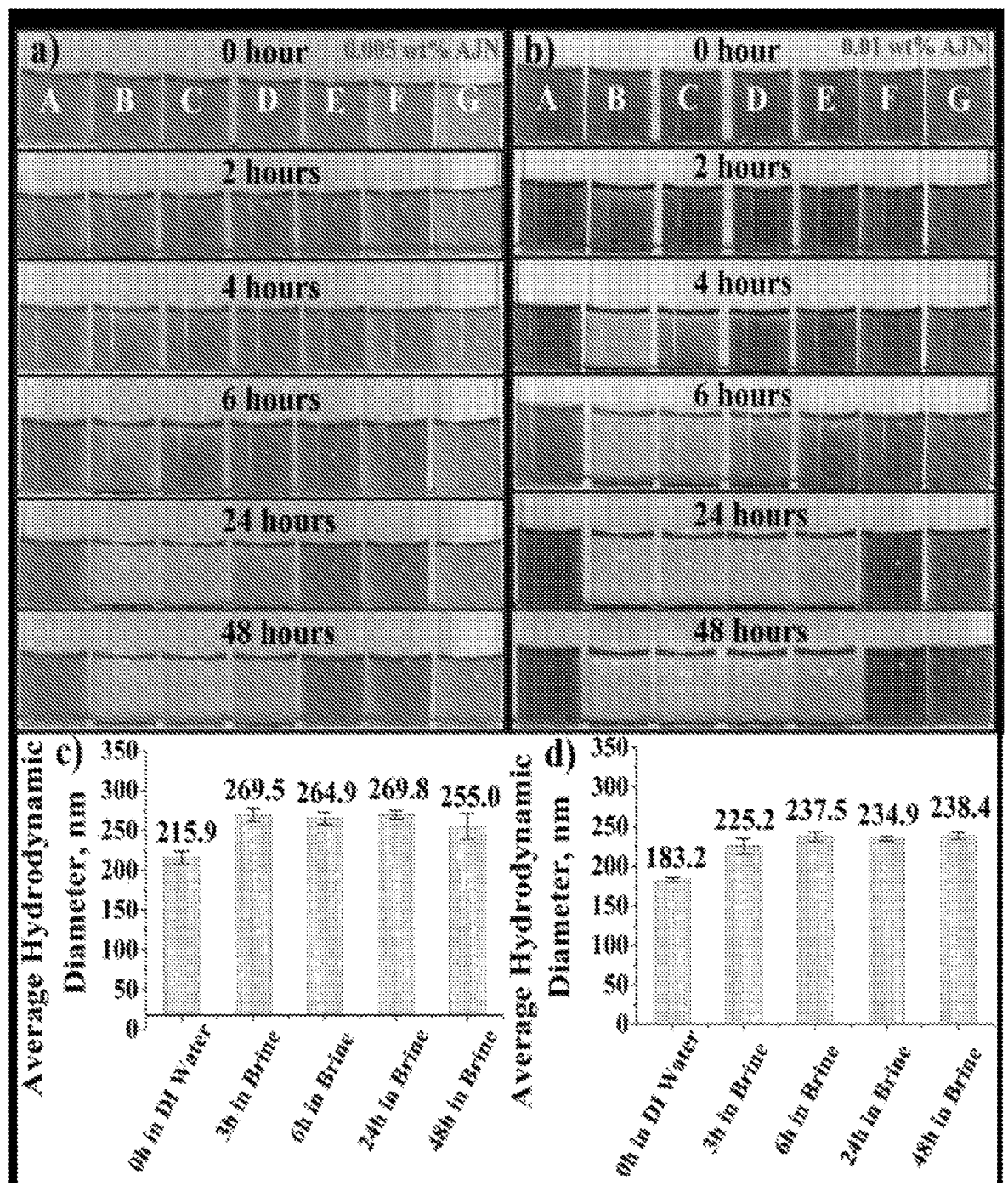
FIG. 1: depicts a visual stability testing of a) 0.005 wt. % and b) 0.01 wt. % graphene-based AJNs in brine (containing 3 wt. % NaCl and 0.5 CaCl2) with different concentrations of PSS. (A: No PSS in DI water; B: 0.01 wt. % PSS in brine; C: 0.1 wt % PSS in brine; D: 0.25 wt. % PSS in brine; E: 0.5 wt. % PSS in brine; F: 0.75 wt. % PSS in brine; G: 1 wt. % PSS in brine). Hydrodynamic diameter measurements of c) 0.005 wt. % AJNs with 0.5 wt. % PSS, and d) 0.01 wt. % AJNs with 0.75 wt. % PSS in brine.

In some embodiments, dispersions of AJNs at two concentrations (0.005 and 0.01 wt. %) with a series of PSS concentrations were made in brine (3 wt. % NaCl and 0.5 wt. % $CaCl_2$). Visual stability evaluations of the dispersions were then conducted as shown in FIGS. 1a and 1b, and a solution of AJNs dispersed in DI water was used as a control. After 48 h, 0.005 wt. % AJNs were minimally aggregated in the presence of 0.5 wt. % or higher concentrations of PSS. For 0.01 wt. % AJNs, aggregation was prevented with PSS concentrations of 0.75 wt. % or higher. As additional evidence that PSS stabilized AJNs, the evolution of average hydrodynamic diameter (HD) of two sets of samples, 0.005 wt. % AJNs with 0.5 wt. % PSS and 0.01 wt. % AJNs with 0.75 wt. % PSS were monitored (as depicted in FIGS. 1c and 1d. The average HD of AJNs in brine with PSS at different time points were nearly identical in the two cases, indicating stable colloidal systems during the time period. In addition, the HD of AJNs with PSS in brine is larger than that of AJNs with PSS in DI water, which is consistent with the results of molecular dynamic (MD) simulations, as discussed below.

The mechanism of PSS stabilization of AJNs in brine begins with attachment of PSS molecules to both the hydrophobic and hydrophilic surfaces of AJN. The highly charged PSS molecules have weak binding with $Ca^{2+}$, which facilitates electro-steric repulsive interactions over van der Waals (VDW) and hydrophobic attractive interactions. When binary phases, e.g., oil and water, are present, the PSS molecules that are initially bonded non-covalently with hydrocarbon chains from the hydrophobic surface of AJN detach and are replaced by oil molecules. As a result, the AJNs are able to maintain interfacial behavior.

The average HDs of AJNs dispersed in DI water and PSS solutions with different concentrations were detected by the Nanosight NS300. The results showed that the HD changed incrementally as a function of surface conjugation (Mehtala, J. G.; Wei, A. Langmuir 2014, 30, 1373; Israelachvili, J. N. Intermolecular and surface forces: revised third edition. Academic press: Waltham, 2011; Chapter 6).

Figure 2:
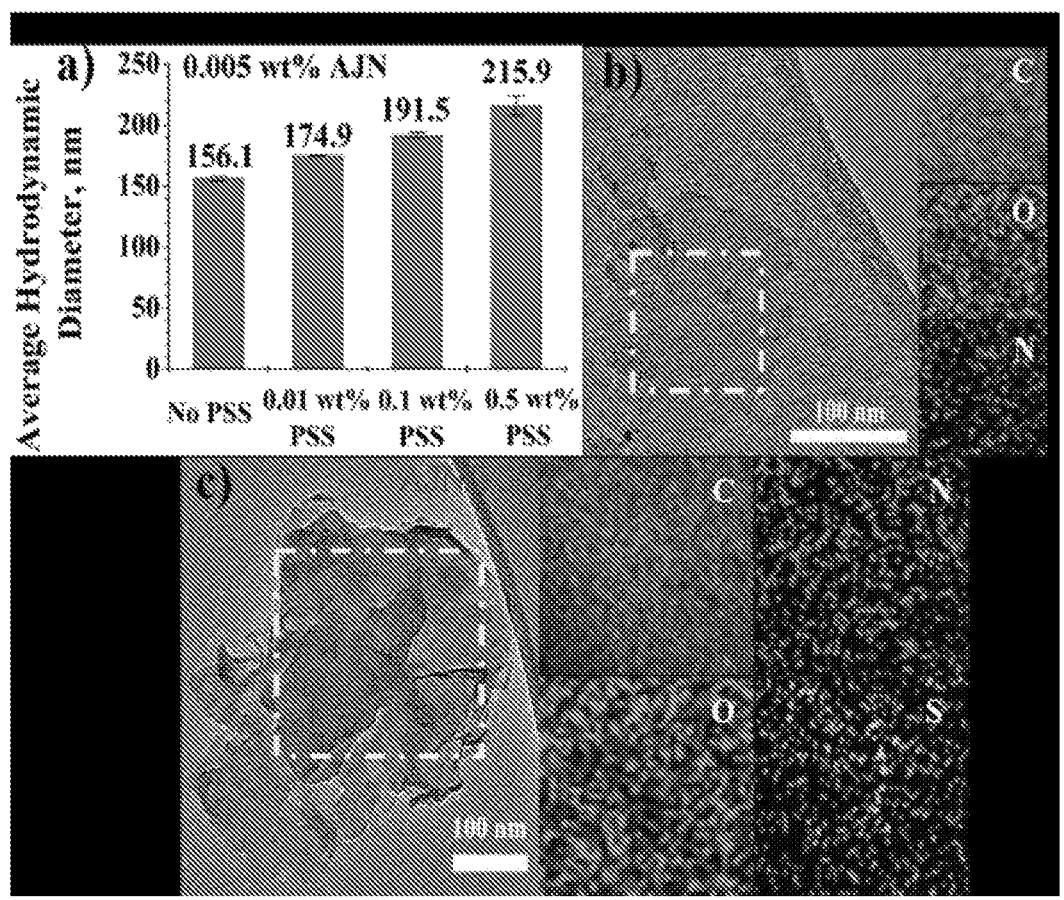
FIG. 2: depicts a) Hydrodynamic diameter measurements of graphene-based AJN in DI water with increasing PSS concentrations. TEM-EDS mapping of b) AJN and c) AJN/PSS after centrifuging and washing.

With increasing concentration, more PSS molecules adsorbed onto the surfaces of the AJNs, thereby raising the HD (FIG. 2a). In some embodiments, transmission electron microscopy energy-dispersive X-ray spectroscopy (TEM-were employed.

The average HDs of AJNs dispersed in DI water and PSS solutions with different concentrations were detected by the Nanosight NS300. The results showed that the HD changed incrementally as a function of surface conjugation. With increasing concentration, more PSS molecules adsorbed onto the surfaces of the AJNs (thereby raising the HD). Transmission electron microscopy energy-dispersive X-ray spectroscopy (TEM-EDS) was also used to confirm PSS attachment.

The AJNs with associated PSS (AJN/PSS) were collected by centrifuging and washing to eliminate free PSS. FIG. 2b shows that the lateral size of AJN imaged by TEM matches with the HD measurement of AJN without PSS (FIG. 2a).

EDS mapping exhibited only three main elements, C, O, and N, the major components of AJN, as previously found. However, as shown in FIG. 2c, an additional element, S, indicative of the presence of PSS sulfonate, was also found in the AJN/PSS sample. The same AJN/PSS sample was re-dispersed in DI water for zeta potential measurement. The zeta potential of AJN/PSS was found to be −52.3 mV, while that of AJN was found to be −22.0 mV.

The enhanced absolute value was due to the surface adsorption of highly charged PSS on both surfaces of AJN, which increased the zeta potential and, consequently, electrostatic repulsion.

Simulations

Figure 3:
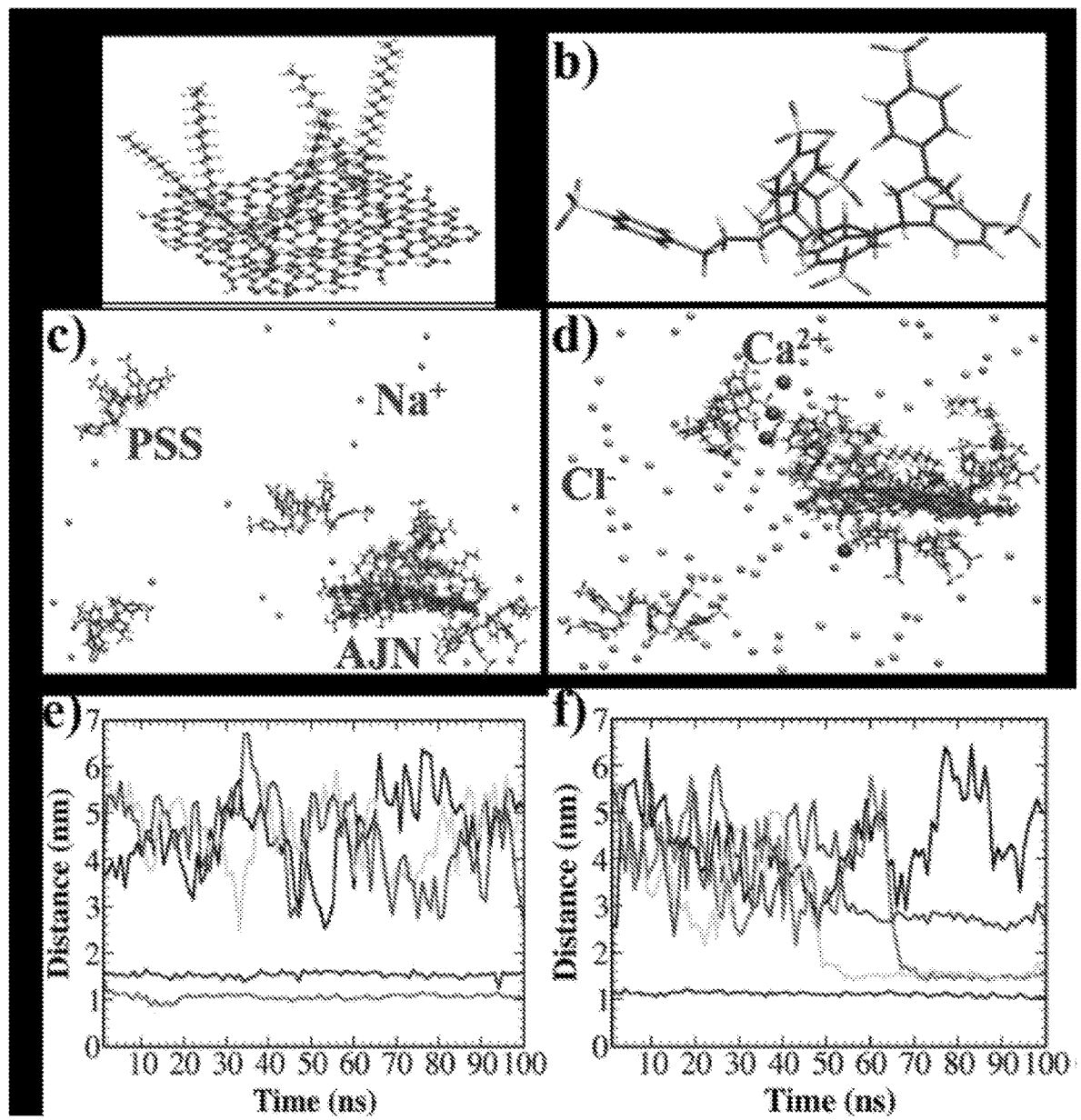
FIG. 3: depicts Molecular structures of a) graphene-based AJN and b) PSS. MD simulations of the interactions between AJN and PSS in fresh water (c), and in brine (d). The evolution of COM distance between AJN and five PSS molecules in fresh water (e), and in brine (f). Curves with steadily short COM distance represent association of PSS with AJN.

MD simulations were performed using GROMACS 5.1.4 to investigate the interactions between PSS and AJN (Abraham, M. J.; Murtola, T.; Schulz, R.; Pall, S.; Smith, J. C.; Hess, B.; Lindahl, E. SoftwareX 2015, 1-2, 19). The molecular structures of AJN and PSS were constructed via PyMOL, as depicted in FIGS. 3a) and 3b) (The PyMOL Molecular Graphics System, Version 1.7.4, Schrödinger, LLC; TPPmktop). The charge distribution of PSS was additionally computed by the Atomic Charge Calculator (Ionescu, C.; Sehnal, D.; Falginella, F. L.; Pant, P.; Pravda, L.; Bouchal, T.; Vareková, R. S.; Geidl, S.; Koča, J. J. Cheminform. 2015, 7, 50). Detailed information on molecular model construction and simulation methods can be found below:

Molecular Dynamics Simulation Method

A 24.9 Å×25.9 Å mono layer graphene with 238 carbon atoms was used as substrate.4 A 30% oxidized graphene oxide was constructed by attaching 4 carboxyl groups to the edges, 24 epoxy groups and 28 hydroxyl groups to the bottom, top and edges of the graphene. 5 octadecylamine molecules were attached to one side of graphene oxide to construct graphene-based amphiphilic Janus nanosheets (AJNs) via ring-opening epoxy groups. 6 sodium 4-styrenesulfonate (SS) unites were connected to form a poly (sodium 4-styrenesulfonate) (PSS) molecule. All of the construction processes were implemented with PyMOL.5. The charge distribution of PSS was additionally computed by Atomic Charge Calculator. The topology structures were created with TPPmktop.

The molecular dynamics simulation (GROMACS 5.1.4.8/ OPLS-AA force field) was used for the simulation. After an energy minimization, the system underwent a 5 ns equilibration at 300 K (NVT ensemble) and a 5 ns equilibration at 1 bar (NPT ensemble), followed by a 100 ns production run. The time step was set to 2 fs. All bond lengths were constrained using the LINCS algorithm. Cut-off of 1.2 nm was used for Lennard-Jones interactions and the real part of the long-range electrostatic interactions, which were calculated using the Particle-Mesh Ewald (PME) method. 0.16 nm grid spacing was used for PME. The information of system was recorded every 100 ps.

In the simulation of AJN with PSS molecules in fresh water, the periodic box size was 80 Å×80 Å×80 Å (Length× Wide×Height). One AJN molecule was placed in the center of box. 5 PSS molecules and 16569 water molecules were randomly distributed in the box.

In the simulation of AJN with PSS molecules in brine (3 wt. % NaCl and 0.5 wt. % CaCl2), the periodic box size was 80 Å×80 Å×80 Å. One AJN molecule was placed in the center of box. 5 PSS molecules, 188 Na+ ions, 186 Cl— ions, 14 Ca2+ ions, and 16420 water molecules were randomly distributed in the box.

In the simulation of AJN with PSS molecules in oil/brine biphasic system, the periodic box size was 60 Å×60 Å×90 Å. One AJN attached by PSS molecules was placed in the center of box. 444 heptane molecules were distributed on the top part of the box (60 Å×60 Å×30 Å). 5 PSS molecules, 84 Na+ ions, 78 Cl— ions, 6 Ca2+ ions, and 7587 water molecules were randomly distributed in the bottom part of the box (60 Å×60 Å×60 Å).

As described above, in one embodiment the interaction between one AJN and five PSS molecules in fresh water was first simulated by MD. Initially the molecules were randomly distributed in the simulation box with more than 3 nm center of mass (COM) distance from each of the PSS to AJN. In the final equilibrium state, as shown in FIG. 3c, two PSS molecules are adsorbed onto AJN, one is attached to a hydrocarbon chain of the hydrophobic surface, while the other one molecule is attached to the hydrophilic surface. This was also reflected on the COM evolution curve, as drawn in FIG. 3e). Two out of five PSS molecules dis-played steady COM distances which were less than 3 nm, i.e., on the hydrophilic surface, the COM distance to the PSS molecule was about 1 nm, while, on the hydrophobic surface, this distance was about 1.6 nm due to the presence of extended hydrocarbon chains. Moreover, both hydrophobic and hydrophilic surfaces were non-covalently bonded with the backbone of PSS, leaving the charged sulfonate groups facing out, thus indicating that the dominant interactions between PSS and AJN are hydrophobic and VDW attractions.

In a salt environment, as simulated in FIGS. 3d and 3f, an additional PSS molecule was adsorbed onto the hydrophobic surface of the AJN. This was the result of an ion screening effect, which reduced the Debye lengths of PSS and AJN and, consequently, decreased electrostatic repulsion interactions between PSS molecules or between PSS and AJN. More specifically, in a fresh water system, the sulfonate groups of PSS that are attached onto the hydrophobic surface, combined with existing hydroxyl groups on AJN, which originate from GO and also formed during alkylamine conjugation with epoxy groups (Tan, M. T.; Liu, X.; Li, W.; Li, H. X. J. Chem. Eng. Data 2015, 60, 1469; Dreyer, D. R.; Park, S.; Bielawski, C. W.; Ruoff, R. S. Chem. Soc. Rev. 2010, 39, 22828, 29) can generate repulsive forces, that are stronger than hydrophobic and VDW attractive forces, thus preventing further adsorption of PSS molecules. However, when these repulsions decreased, more PSS molecules tended to move towards the surface. Therefore, more PSS attachments were found in brine than in fresh water. As demonstrated in FIG. 3d, the purple colored $Ca^{2+}$ ions can bridge sulfonate groups of PSS molecules. The increase in PSS attachment and $Ca^{2+}$ bridging may contribute to the larger HD of AJN/PSS in brine, as compared to DI water. Furthermore, there were no differences in the configuration of PSS attached to AJN surfaces under salt conditions. The PSS backbone still docked onto AJN surfaces with the sulfonate groups facing outward. Due to this configuration, electro-steric repulsion can be employed to stabilize AJN in brine.

Figure 4:
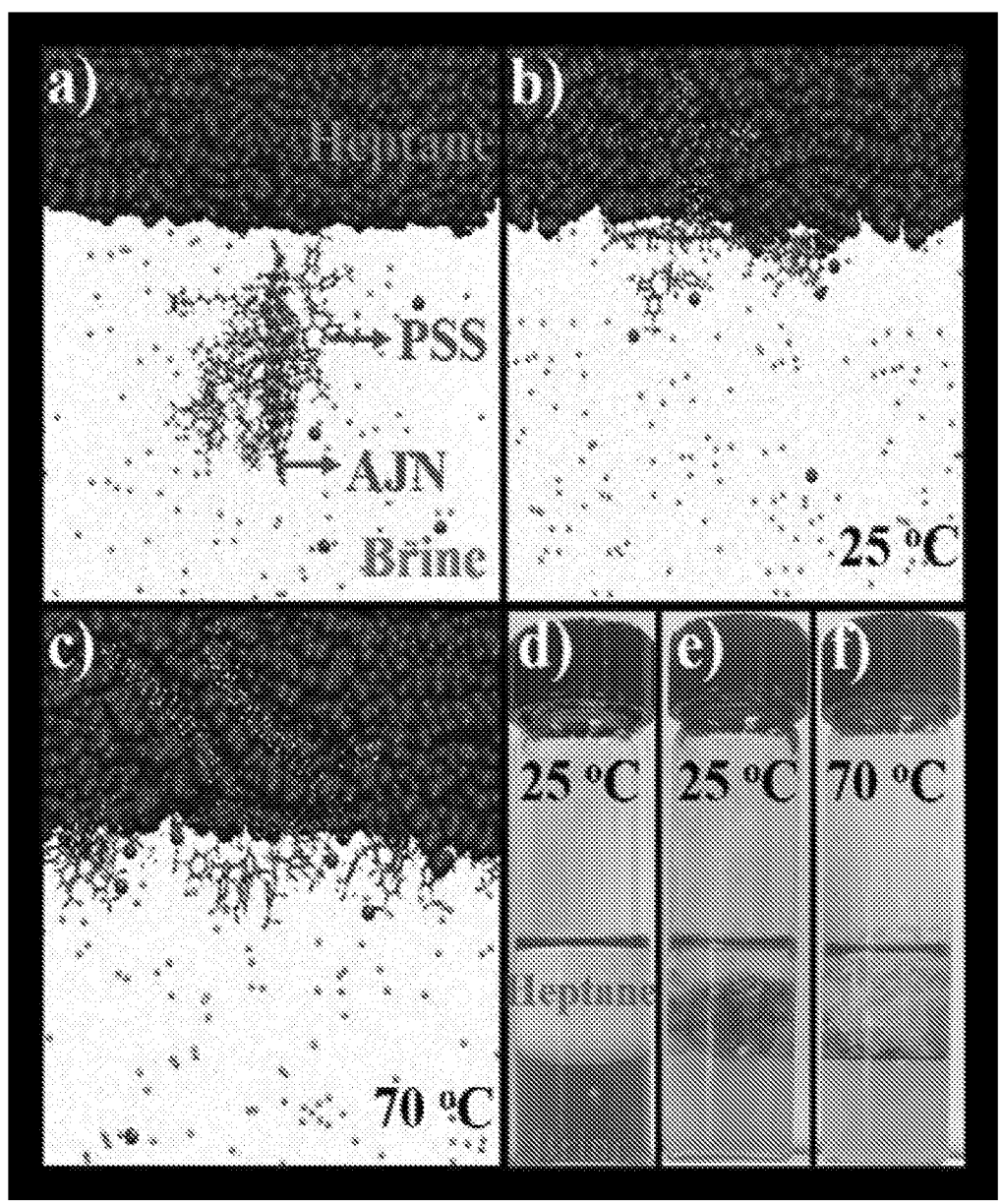
FIG. 4: depicts MD simulations of interactions between graphene-based AJN and PSS in heptane/brine system. a) Initial state before simulation; b) Simulation at 25° C.; c) Simulation at 70° C. Visual observation of AJN/PSS mixture in heptane/brine system. d) Initial state before shaking; e) After shaking at 25° C.; f) After shaking at 70° C.

To check whether the interfacial behavior of AJN in the presence of PSS was retained in brine, heptane molecules were added to the simulation, as shown in FIG. 4a. Initially, two PSS molecules attached to the hydrophobic side of AJN, while one PSS molecule attached to the hydrophilic surface. After simulation at 25° C., the AJN moved to the heptane/brine interface with all of the hydrocarbon chains inserting into the heptane phase. However, PSS was no longer attached. Detachment was due to hydrophilic attraction between the sulfonate groups of PSS and water molecules, thus PSS molecules were driven into the water phase. With the AJN being captured at the oil/water interface, the interfacial tension can be reduced. In another embodiment the effect of temperature on the bi-phasic system with a simulation performed at 70° C. (FIG. 4c) was also considered.

The result was similar to what was obtained at 25° C., except that equilibrium was reached in a shorter time period due to increased molecular motion. Experiments were also conducted to confirm that the interfacial behavior could be maintained. As shown in FIG. 4d, initially, AJN/PSS dispersed in brine phase was at the lower part (brown color), while the heptane phase was at the upper part. The curved interface was due to heptane/brine interfacial tension. After shaking at 25° C., the brown color almost disappeared, indicative of the depletion of AJN from the brine phase. Instead, the AJN acted as a stabilizer to the droplets in the middle part, as displayed in FIG. 4e. The original curved interface was no longer observed. When the system was shaken at 70° C., droplets formed and soon broke to generate a flat film at the heptane/brine interface, as shown in FIG. 4f. This film appeared to be elastic when subjected to the intrusion of a glass rod, similar to our previous observations.

In summary, we employed PSS polyelectrolytes to successfully stabilize graphene-based AJN in water with relatively high salt content, without disturbing the interfacial behavior in oil/water bipha-sic systems. Following mixing, PSS molecules non-covalently associate with the surfaces of AJNs. This association was supported by TEM-EDS mapping, as well as zeta potential and HD measurements. MD simulations further showed that the configuration of adsorbed PSS molecules on the AJN surfaces could facilitate electro-steric repulsive interactions over attractive interactions thus stabilizing AJN in brine. When AJN/PSS was placed in an oil/brine bi-phasic system, detachment occurred on the hydrophobic side of AJN, allowing the AJN to retain asymmetrical surface wettability and stay at the biphasic interface. An elastic interfacial film can still form at the interface.

Example 2

Graphene-based amphiphilic Janus nanosheets were synthesized by hydrophobizing one side of GO with alkylamine. In one embodiment, functionalization restores the graphitic sp2 network, which alters the surface electronic structure of GO, therefore produces physical properties that are different from those of the parent GO.

To calculate interaction energy potentials between such colloids, the surface conjugation ratio (defined as the ratio of alkylamine-functionalized sites to the total available functional sites on the GO surface) and physical properties of the material must be determined in order to develop a methodology for characterizing the colloidal behavior of the amphiphilic Janus nanomaterials and the factors that affect it. Therefore, provided herein is a method for evaluating the stability of these and other amphiphilic Janus nanomaterials, controlling self-assembly to create more complex structures, and stabilizing nanosheets for applications in extreme environments, e.g., at high salinities or temperatures.

Modeling Methods

In order to maximize the transport properties of graphene-based amphiphilic Janus nanosheets in rock pores, the lateral dimension or length is in some embodiments about 50 nm to about 350 nm, and in further embodiments to about 100 nm to about 300 nm, and a further embodiment from 150 to 300 nm. Following alkylamine conjugation, the nanosheet thickness was evaluated using atomic force microscopy (AFM). The thickness was in some embodiments about 2-5 nm and in another embodiment about 3.7 nm. The nanosheet aspect ratio (the ratio of the lateral length to the thickness) ranged from 25 to 85, 30 to 60, and 40 to 50 with all values being <100. A two-sphere model was therefore used to characterize interactions between nanosheets.

Herein, the VDW attractive potential, electrostatic repulsive potential, and hydrophobic interactive potential were considered when modeling the interaction potential of the amphiphilic Janus nanosheets. The balance among these interactions defines the behavior of the nanosheets in aqueous solution. The VDW interaction energy between two spheres is shown in:

$$\phi_{VDW} = -\frac{H}{6}\left[\frac{2R_1R_2}{f_1(R_1, R_2, d)} + \frac{2R_1R_2}{f_2(R_1, R_2, d)} + \ln\left(\frac{f_1(R_1, R_2, d)}{f_2(R_1, R_2, d)}\right)\right] \quad (1)$$

$$f_1(R_1, R_2, d) = d^2 + 2R_1d + 2R_2d$$

$$f_2(R_1, R_2, d) = d^2 + 2R_1d + 2R_2d + 4R_1R_2$$

where H is the Hamaker constant, d is the separation of the nanoparticle surface, and R1 and R2 are the radii of the nanoparticles. Quantifying the VDW potential requires determining the Hamaker constant. Because of the lack of a Hamaker constant of the nanosheets, the geometrical mixing rule was not applicable. Therefore, an approach to obtain the Hamaker constant for media 1 and 2 interacting across a medium was used. All media were assessed as having the same absorption frequencies. Because the zero-frequency contribution is usually small, the approximate expression of the Hamaker constant can be reduced, as shown in Equation 2:

$$H \approx \frac{3h\nu_e}{8\sqrt{2}} \frac{(n_1^2 - n_3^2)(n_2^2 - n_3^2)}{(n_1^2 + n_3^2)^{1/2}(n_2^2 + n_3^2)^{1/2}\{(n_1^2 + n_3^2)^{1/2} + (n_2^2 + n_3^2)^{1/2}\}}$$

where h is Planck's constant, $v_e$ is the primary electronic absorption frequency in the UV region, and n is the refractive index in the visible regime. Ve is approximated as:

$$v_e = v_i\sqrt{3/(n_i^2 + 2)}$$

where $v_i$ is the absorption frequency of a Bohr atom (3.3 Å~1015 s$^{-1}$) and $n_i$ the refractive index of the nanosheets. The nanofluid is composed of graphene-based amphiphilic Janus nanosheets dispersed in water. If a refractive index of 1.3325 is used for water, the Hamaker constant may be estimated by determining the refractive index of graphene based amphiphilic Janus nanosheets. The ζ potential of amphiphilic Janus nanosheets in deionized (DI) water is approximately −22 mV, smaller than that of GO. The reduced ζ potential may be due to covalent bonding of an oxygen containing group with alkylamine. For low surface potential at a constant surface charge density, the electrical double-layer interaction energy can be calculated as follows:

$$\emptyset_{EL} = N_1\{N_2 f(d) - \ln[1 - \exp(-2\kappa d)]\} \quad (3)$$

$$N_1 = \pi\varepsilon_0\varepsilon_m R_1 R_2 (\Psi_{0.1}^2 + \Psi_{0.2}^2)/(R_1 + R_2)$$

$$N_2 = 2\Psi_{0.1}\Psi_{0.2}/(\Psi_{0.1}^2 + \Psi_{0.2}^2)$$

$$f(d) = \ln[(1 + \exp(-\kappa d))/(1 - \exp(-\kappa d))]$$

$$\kappa = [2e^2 N_A I/(\varepsilon_0\varepsilon_m kT)]^{1/2}$$

where $\varepsilon_0$ is the vacuum permittivity, $\varepsilon_m$ is the solvent permittivity, and $\Psi_{0.1}$ and $\Psi_{0.2}$ are the surface potentials of nanoparticles, $\kappa$ is the inverse Debye length, e is the elementary charge, NA is Avogadro's number, I is the ionic strength, k is Boltzmann's constant, and T is the absolute temperature, and in some embodiments the $\zeta$ potential was used as the surface potential. In other embodiments the temperature-dependent dielectric constant of water ($\varepsilon_m$) was calculated as 87.73 Å$^{-10-0.002(T-273.15)}$.

The hydrophobic surfaces of amphiphilic Janus nanosheets inherently attract each other and avoid water to minimize the free energy of the system. To quantify this interaction, an empirically derived potential in which the hydrophobic energy is related to interfacial tension and the amount of exposed hydrophobicity was used. Because exposed hydrophobicity is closely correlated to the degree of surface conjugation, the interaction potential may be modified as follows (equation 4):

$$\varnothing_{phobic} = -2A\gamma f_{pho/(pho\,phi)} \exp(d/D_0) \quad (4)$$

where A is the surface area of the hydrophobic side of the nanoparticle, $\gamma$ is the interfacial tension of an alkylamine hydrocarbon molecule in water (40 mN/m), $D_0$ is the hydrophobic decay length (1 nm), and $f_{pho/pho+phi}$ is the surface conjugation ratio. The value of the surface conjugation ratio can be extracted from X-ray photoelectron spectroscopy (XPS) measurements.

Comparable Experimental Methods: the graphene-based amphiphilic Janus nanosheets were synthesized, wherein in some embodiments, graphite was first exfoliated and oxidized. Then, single-surface functionalization of the oxidized graphene with alkylamine was performed via a wax microsphere covering method. The nanofluid was prepared in deionized water followed by sonication.

The refractive index of the amphiphilic Janus nanosheets was measured with reflection spectroscopy using the angle interrogation method, in which the light reflectivity is monitored as a function of the incident angle. A He—Ne laser ($\lambda=633$ nm) was used as a light source, and only p-polarized light was used for the reflection measurement. The sample was prepared using drop casting, in which a few drops of nanofluid were placed on a glass slide and dried on a hot plate. Atomic force microscopy (AFM) (Veeco Dimension 3000) was again used to characterize the morphology of graphene-based amphiphilic Janus nanosheets. AFM was performed in tapping mode with a resolution of 512 Å~512. Silicon AFM probes (HQ:NSC15/AL BS, Mikromasch) with tip radii of about 8 nm were used to perform the measurement. The resonant frequency of the measurements was about 325 kHz, and the force constant was about 40 Nm$^-$. The $\zeta$ potential was measured using a Zetasizer Nano Z. The distance between particles was visualized using a Malvern Nanosight NS300 instrument. The chemical composition of amphiphilic Janus nanosheets was recorded using XPS (Physical Electronics model 5700). A Cary 5000 UV-vis-NIR spectrophotometer was employed to obtain UV-vis spectra.

Figure 6:
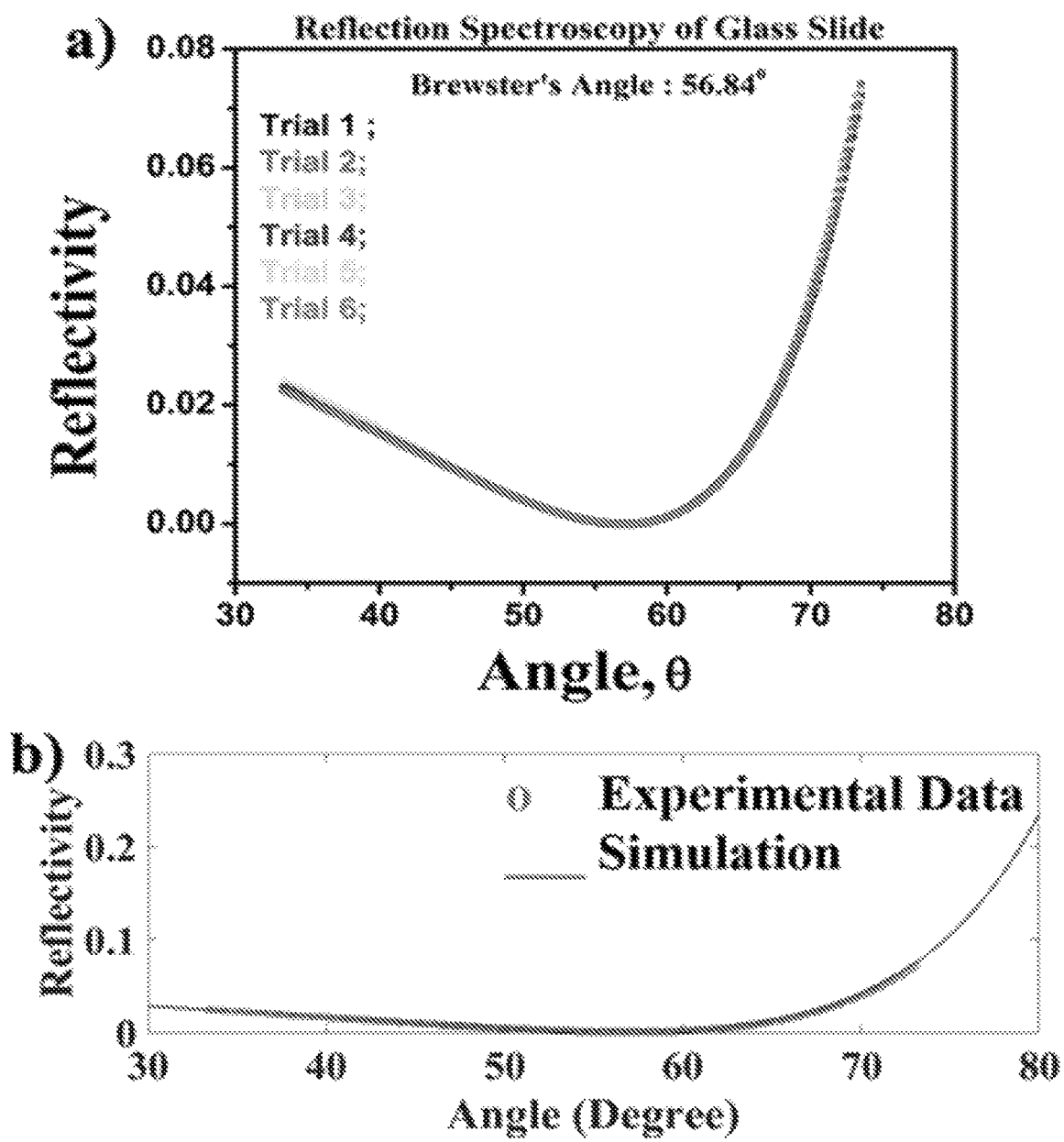
FIG. 6 depicts refractive index measurements of the glass substrate. (a) Six measurements of the reflectivity of the glass substrate in two different spots. (b) shows the simulation result for calculating the refractive index of the glass substrate.
Figure 7:
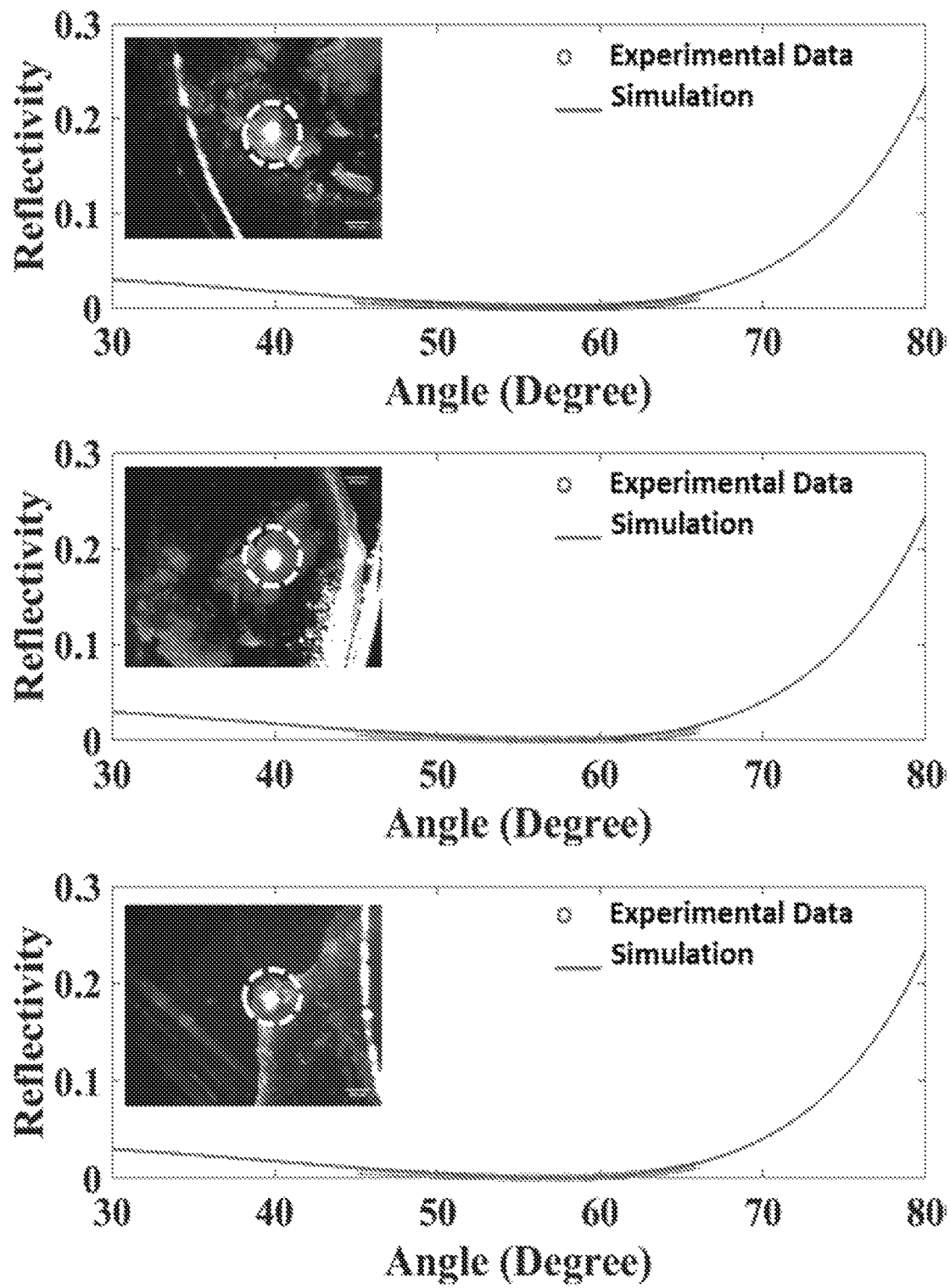
FIG. 7 depicts Refractive index measurements of graphene-based amphiphilic Janus nanosheets. Circles are experimental data, and solid lines are simulated data. Insets show an optical image of the sample on glass substrates and the laser spot.
Figure 8:
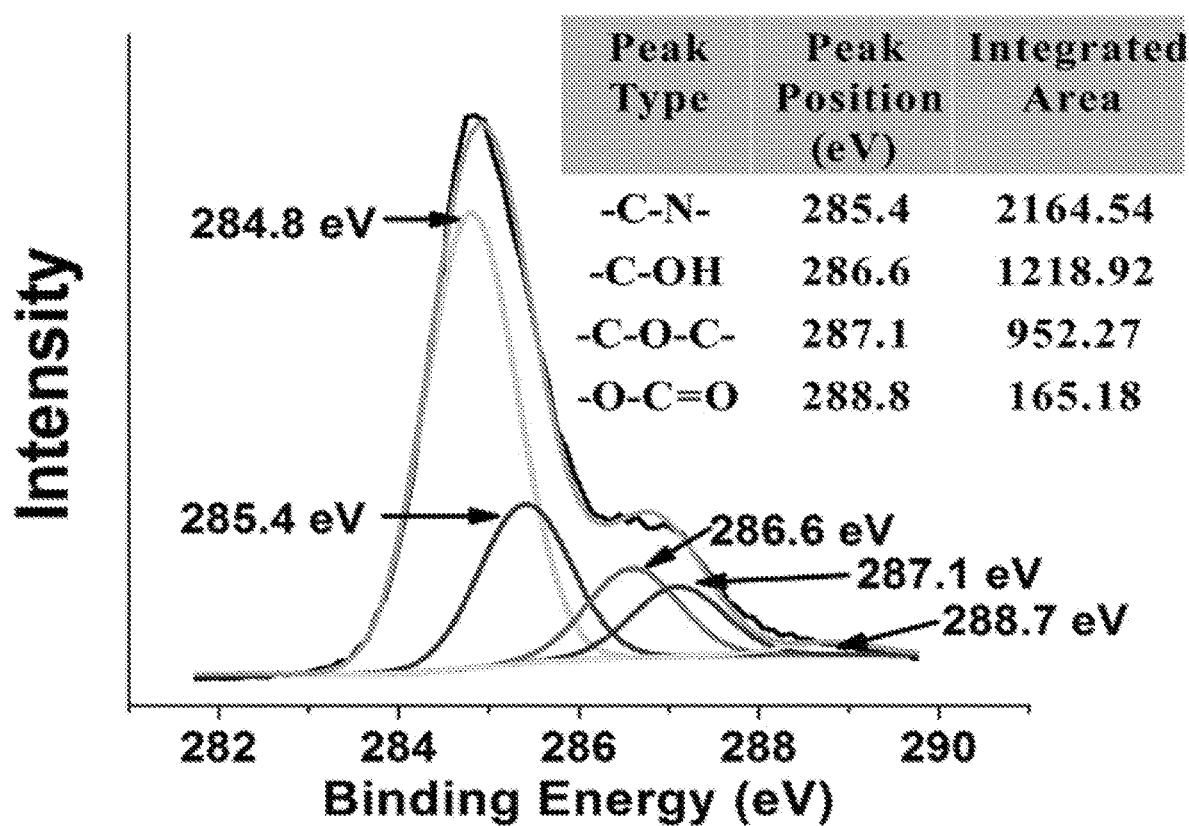
FIG. 8 depicts XPS measurements of graphene-based amphiphilic Janus nanosheets. The inset table shows the integrated areas of each fitted curve.

RESULTS: in some embodiments, six reflectivity measurements of the glass substrate were first collected in two different spots, as shown in FIG. 6a. All of the graphs overlap each other, demonstrating that the measurement is repeatable. As depicted in FIG. 6b, one of the six data sets was selected for simulation to find the Brewster's angle of the glass substrate, which was confirmed as 56.84°. The result is consistent with the refractive index of glass (1.53). The refractive index of the amphiphilic Janus nanosheets was determined, and the experimental data were fitted using Fresnel's equation for a three-layer structure (FIG. 7). The first layer was air; the second nanosheets; and the third, the glass substrate. Reflectivity R for p-polarized light is given as follows (equation 5):

$$R = |r_{123}^P|^2 = \left| \frac{r_{12}^P + r_{23}^P \exp(2i\beta)}{1 + r_{12}^P r_{23}^P \exp(2i\beta)} \right|^2$$

$$\text{where: } \beta = \frac{2\pi}{\lambda} n_2 \cos\theta_2 d$$

$$\text{and: } r_{ij}^P = \frac{n_j \cos\theta_i - n_i \cos\theta_j}{n_j \cos\theta_i + n_i \cos\theta_j}$$

where i and j equal 1, 2, or 3. The real part of the refractive index of the amphiphilic Janus nanosheets on the glass substrate was 1.58, which is comparable with the refractive indices of graphene and its related materials, wherein the differential is produced by the increased thickness of the nanosheet and single-side-functionalized oxidized graphene altering the conductivity, which affected the dielectric property and, thus, modified the refractive index. On the basis of the use of a Shirley background, Gaussian convolution of the nanosheet C 1s XPS results yielded five fitted peaks (FIG. 8) that were assigned as —C—C— (284.8 eV), —C—N— (285.4 eV), —C—OH (286.6 eV), —C—O—C— (287.1 eV), and —O—C=O (288.8 eV). Compared with GO, the additional —CN— peak was introduced because of alkylamine conjugation, which corresponds to hydrophobic sites as the hydrocarbon chains. In addition, the N peak around 400 eV was also detected in XPS spectra, which further demonstrated the successful conjugation of alkylamine. Therefore, the surface conjugation ratio was quantified using the ratio of the —C—N— peak integrated area (2164.54) to the total integrated area of surface functional groups (4500.91). The surface conjugation ratio of the graphene-based amphiphilic Janus nanosheets was approximately 0.48. The coordinates of amphiphilic Janus nanosheets were captured and visualized using a Nanosight NS300 at a nanosheet concentration of 0.005 wt. %.

Figure 9:
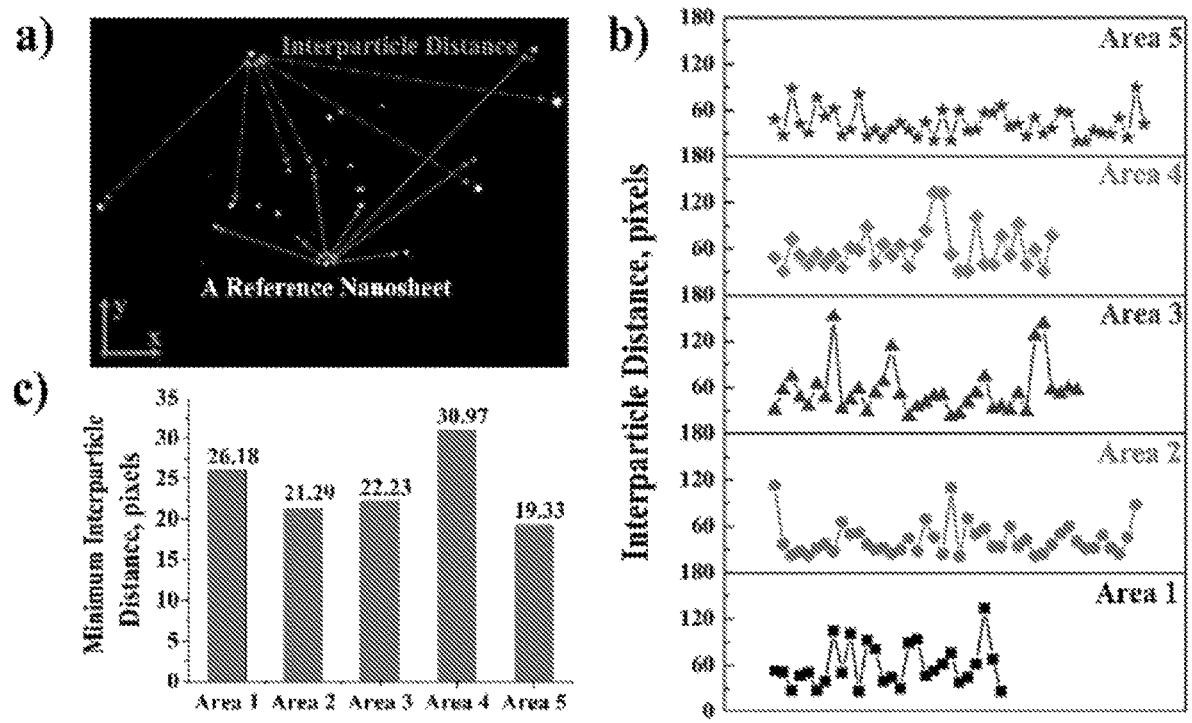
FIG. 9 depicts interparticle distance. (a) The nanosheets were imaged using a Nanosight NS300 instrument. (b)

The interparticle distance was calculated using light scattering (FIG. 9a). One nanosheet was designated as the reference point. The interparticle distance between the reference and all other nanosheets in the same frame was calculated. Then, a different nanosheet was selected as a reference, and the calculation was repeated for every visible nanosheet. The shortest distance observed for each reference nanosheet and the minimal interparticle distance in five different areas are shown in panels b and c of FIG. 9, respectively. The distance unit used was a pixel, and one pixel represents approximately 160 nm here. The averaged hydrodynamic diameter of the nanosheets was reported previously to be 120 nm. After subtraction of the size of the nanosheet, the interparticle distance was at the micrometer level. Once the refractive index and surface conjugation ratio were determined, the total interaction potential was quantified. Negative interaction potentials predict an unstable fluid system.

For amphiphilic Janus nanomaterials, hydrophobic interactions cause a loss of stability in a polar solvent. Therefore, the influence of hydrophobic interactions was assessed. When hydrophobic force is not included in the calculation, the nanofluid is theoretically stable at 0.01 mol of NaCl/L (FIG. 10a). However, stability is lost once hydrophobic force is added to the calculation (FIG. 10b). Experiments showed that amphiphilic Janus nanosheets aggregate and precipitate in 0.01 mol of NaCl/L because of ion screening effects (FIG. 10d).

Therefore, classical DLVO theory, which includes only VDW and electrostatic interaction, failed to evaluate the stability of amphiphilic Janus nanosheets. In practice, atmospheric carbon dioxide dissolves in DI water, leading to an ionic strength equivalent to $10^{-6}$ mol of NaCl/L at equilibrium. The ratio of interaction potential to thermal energy at that ionic strength is >30 at an interparticle distance of 1000 nm (FIG. 10b), i.e., the experimentally determined distance of the nanosheets discussed above. On the basis of this ratio, graphene-based amphiphilic Janus nanosheets may be stably disperse in DI water, as supported by (FIG. 10d). In addition, the hydrophobic force increased the minimal requirement for stable interparticle distances, which is highlighted by the shifting zero-potential points for these curves at very low salt concentrations, i.e., 5 Å~$10^{-6}$, 1 Å~$10^{-5}$, and 0.1 Å~$10^{-4}$ mol/L. Furthermore, when the temperature was increased from 25 to 75° C., the interaction potential curve did not change appreciably and the nanofluid maintained its stability (FIG. 10c). When the nanofluid was tested experimentally, there was no observable aggregation in the nanofluid after several hours at 75° C. (FIG. 10d). A UV-vis spectrophotometer was further used to characterize the colloidal stability as the decrease in intensity may reflect a change in particle concentration, which may be caused by agglomeration. After the samples had settled for 5 h, the spectra of amphiphilic Janus nanosheet dispersions with the same concentrations in DI water as well as in three other NaCl solutions ($10^{-5}$, $10^{-4}$, and $10^{-2}$ M) were recorded as shown in FIG. 11b, wherein the lowest curve corresponds to the $10^{-2}$ M concentration of NaCl. Amphiphilic nanosheets in $10^{-4}$ and $10^{-5}$ M NaCl solutions after settling for 5 h and in DI water after settling for 0 and 5 h all displayed quite similar spectra with little difference. On the other hand, the spectrum of amphiphilic nanosheets in a $10^{-2}$ M NaCl solution gave a significantly lower intensity. After settling overnight, the nanosheets dispersed in a $10^{-2}$ M NaCl solution completely precipitated.

However, in some embodiments amphiphilic nanosheets in water and NaCl solutions at concentrations of $10^{-5}$ and $10^{-4}$ M displayed negligible precipitation even after settling for 7 days. At certain interparticle distances, the hydrophobic attraction may become the dominant interaction compared with electrical double-layer repulsive interaction. The domination distance is about 80 nm. For a Debye length at the same level of that distance (about 95 nm for a solution with a $10^{-5}$ M NaCl concentration and 134 nm in DI water), the interaction potential of an electrical double layer for nonspherical particles beyond the hydrophobic domination distance can be expressed as the potential of its effective spherical particles times the anisotropic function. The anisotropic function depends on the value of inverse Debye length K, multiplied by half the length of the lateral size of the nanosheets ($l_{half}$) and also on the angle between them. As discussed above, the aspect ratio of the nanosheets with a 3.7 nm thickness is between 25 and 85 (<100). Therefore, the range of $Kl_{half}$ is from 0.34 to 1.7 (<2), which shows the anisotropic effect is not significant under the constant surface charge density assumption. In addition, the particle distance for DI water was measured at the micrometer level, and the interaction itself was weak. Therefore, using a two-sphere model as described herein with an aspect ratio of <100 is functional, and the modeling results match well with those of the experimental testing. As discussed herein, 0.01 mol/L (0.05844 wt. %) NaCl may destabilize the nanofluid.

To disperse amphiphilic Janus nanosheets on the surface with seawater or in high-saline water for oil recovery in the future, appropriate stabilizers (such as PSS) that permit this dispersion while maintaining the unique interfacial behavior of the nanosheets are provided.

Hence, a method of theoretically investigating the colloidal stability of graphene-based amphiphilic Janus nanosheets and the factors affecting it are also herein disclosed. The Hamaker constant of graphene-based amphiphilic Janus nanosheets has been determined by obtaining the refractive index of the nanosheets with the help of reflection measurement, which was the key to quantifying the van der Waals interaction potential. A modified expression for calculating the hydrophobic interaction was proposed by using the parameter of the surface conjugation ratio of the nanosheets, which can be extracted from XPS data. The influence of hydrophobic interaction on stability evaluation was also investigated and verified by experiments, which demonstrated that classical DLVO theory failed to study the colloidal behavior for amphiphilic Janus nanomaterials. The factors, including ionic strength and temperature, affecting the fluid stability have been discussed. The results were in good agreement with results of both UV-vis and visual stability testing under such conditions, validating the method presented here for colloidal stability evaluation of the amphiphilic Janus nanosheets.

What is claimed is:

1. A salt water dispersed nanofluid, wherein the nanofluid comprises:
    a dispersion comprising:
       polyelectrolyte comprising poly sodium 4-styrenesulfonate (PSS);
       amphiphilic Janus nanosheets comprising graphene oxide derivatized with at least one alkylamine group;
       NaCl; and
       $CaCl_2$),
    wherein the dispersion comprises at least 3.5 wt. % NaCl and at least about 0.5 wt. % $CaCl_2$), and wherein the salt water dispersed nanofluid maintains a same interface behavior in brine as in fresh water, thus indicating colloidal stability.

2. The nanofluid of claim 1, wherein the dispersion comprises the polyelectrolyte and the amphiphilic Janus nanosheets dispersed in a brine comprising the NaCl and the $CaCl_2$).

3. The nanofluid of claim 1, wherein said nanofluid maintains the same interface behavior in the brine as in the fresh water to at least 70° C.

4. The nanofluid of claim 1, wherein the nanosheets are stable in a single phase.

5. The nanofluid of claim 1, wherein said nanofluid further comprises an elastic film at an oil/brine interface.

6. The nanofluid of claim 5, wherein said elastic film is formed at a temperature of at least 70° C.

7. The nanofluid of claim 1, wherein said amphiphilic Janus nanosheets comprise a lateral dimension of about 50 to about 350 nm.

8. The nanofluid of claim 1, wherein the nanosheet thickness is about 3.7 nm.

9. The nanofluid of claim 1, wherein the aspect ratio of the amphiphilic Janus nanosheets is less than 100.

10. The nanofluid of claim 1, wherein the amphiphilic Janus nanosheets comprise a surface conjugation ratio of about 0.48.

11. The nanofluid of claim 1, wherein said nanofluid comprises a surfactant, and wherein the surfactant comprises an elastic interfacial film at an oil/water interface.

12. The nanofluid of claim 11, wherein the oil/water interface is a hydrocarbon/brine solution, comprising a hydrophobic/hydrophilic interface.

13. A nanofluid of claim 11, wherein said elastic interfacial film is formed in a geologic formation comprising a hydrocarbon, and wherein said elastic interfacial film at said hydrophobic/hydrophilic interface releases said hydrocarbon from a geological formation for enhanced oil recovery.

14. The nanofluid of claim 1:
- comprising 0.005 wt % of the amphiphilic Janus nanosheets and greater than 0.5 wt % PSS, and wherein an average hydrodynamic diameter of the amphiphilic Janus nanosheets is greater than a hydrodynamic diameter of amphiphilic Janus nanosheets in a same dispersion absent the NaCl; or
- comprising 0.01 wt % of the amphiphilic Janus nanosheets and greater than 0.75 wt % PSS, and wherein an average hydrodynamic diameter of the amphiphilic Janus nanosheets is greater than a hydrodynamic diameter of amphiphilic Janus nanosheets in a same dispersion absent the NaCl.

\* \* \* \* \*